US012797790B2

(12) United States Patent
Nakamura et al.

(10) Patent No.: US 12,797,790 B2
(45) Date of Patent: Nov. 17, 2026

(54) ABATEMENT APPARATUS FOR EXHAUST GAS

(71) Applicant: EBARA CORPORATION, Tokyo (JP)

(72) Inventors: Satoru Nakamura, Tokyo (JP); Kazutomo Miyazaki, Tokyo (JP); Takeshi Eda, Tokyo (JP)

(73) Assignee: EBARA CORPORATION, Tokyo (JP)

( * ) Notice: Subject to any disclaimer, the term of this patent is extended or adjusted under 35 U.S.C. 154(b) by 695 days.

(21) Appl. No.: 18/067,841

(22) Filed: Dec. 19, 2022

(65) Prior Publication Data

US 2023/0201765 A1 Jun. 29, 2023

(30) Foreign Application Priority Data

Dec. 24, 2021 (JP) ................................ 2021-210146

(51) Int. Cl.
*B01D 53/34* (2006.01)
*B01D 53/73* (2006.01)

(52) U.S. Cl.
CPC .......... *B01D 53/346* (2013.01); *B01D 53/73* (2013.01); *B01D 2258/0216* (2013.01)

(58) Field of Classification Search
CPC .. B01D 47/02; B01D 53/005; B01D 53/1456; B01D 53/18; B01D 53/30; B01D 53/346; B01D 53/58; B01D 53/68; B01D 53/73; B01D 53/75; B01D 53/78; B01D 2252/103; B01D 2257/2025; B01D 2257/2027; B01D 2257/204; B01D 2257/2047; B01D 2257/406; B01D 2257/55; B01D 2258/0216; C23C 16/4405; C23C 16/4408; C23C 16/455; F23G 7/06; F23G 2209/14; F23G 2209/142
See application file for complete search history.

(56) References Cited

FOREIGN PATENT DOCUMENTS

| | | | |
|---|---|---|---|
| CN | 205860040 | U | 1/2017 |
| JP | 2002-317916 | A | 10/2002 |
| JP | 2008-114139 | A | 5/2008 |

(Continued)

OTHER PUBLICATIONS

Translation of JP7038196B2, accessed Jul. 3, 2025 (Year: 2022).*

(Continued)

*Primary Examiner* — Jennifer Dieterle
*Assistant Examiner* — Phillip Y Shao
(74) *Attorney, Agent, or Firm* — Chrisman Gallo Tochtrop LLC

(57) ABSTRACT

An abatement apparatus capable of treating exhaust gas with less wet treatment devices than a conventional abatement apparatus is disclosed. The abatement apparatus includes: a pre-wet treatment device; a combustion treatment device; gas introduction lines coupled to process chambers of a film forming device; first flow-path switching devices coupled to the plurality of gas it lines, respectively; a first gas delivery line extending from the first flow-path switching devices to the pre-wet treatment device; a second gas delivery line extending from the first flow-path switching devices to the combustion treatment device; and an operation controller configured to control operations of the first flow-path switching devices to deliver the process gas to the pre-wet treatment device and deliver the cleaning gas to the combustion treatment device.

3 Claims, 9 Drawing Sheets

(56) References Cited

FOREIGN PATENT DOCUMENTS

| | | | | | |
|---|---|---|---|---|---|
| JP | 2015-227618 | A | | 12/2015 | |
| JP | 5977419 | B1 | | 8/2016 | |
| JP | 7038196 | B2 | * | 3/2022 | ............. B01D 53/38 |
| WO | 2019/186616 | A1 | | 10/2019 | |

OTHER PUBLICATIONS

Translation of wo2019186616, accessed Jul. 3, 2025 (Year: 2019).*
Translation of JP2015227618A, accessed Jul. 3, 2025 (Year: 2015).*

* cited by examiner

ABATEMENT APPARATUS FOR EXHAUST GAS

CROSS REFERENCE TO RELATED APPLICATION

This document claims priority to Japanese Patent Application Number 2021-210146 filed Dec. 24, 2021, the entire contents of which are hereby incorporated by reference.

BACKGROUND

In manufacturing of semiconductor devices, a CVD apparatus is used to form a film on a wafer. The CVD apparatus is configured to introduce a process gas, such as dichlorosilane (DCS) or ammonia ($NH_3$), into a process chamber to form a film on a wafer (film formation process). After the film formation process, a purge gas, such as nitrogen gas, is supplied into the process chamber to remove the process gas from the process chamber (purging process). Further, a cleaning gas, such as fluorine gas ($F_2$) or hydrogen fluoride gas (HF), is supplied into the process chamber to clean an interior of the process chamber (cleaning process).

In the CVD apparatus, the film formation process, the purging process, and the cleaning process are repeatedly performed. Since the process gas and the cleaning gas are harmful gases, both gases must be treated with an abatement apparatus. The CVD apparatus typically includes a plurality of process chambers in order to increase productivity. The abatement apparatus is coupled to the plurality of process chambers and treats the process gas and the cleaning gas exhausted from each process chamber.

FIG. 9 is a schematic diagram showing a conventional abatement apparatus. As shown in FIG. 9, the abatement apparatus includes a plurality of wet treatment devices 501 and a combustion treatment device 502. The plurality of wet treatment devices 501 are coupled to a plurality of process chambers 500, respectively, and the combustion treatment device 502 is coupled to the wet treatment devices 501. Each wet treatment device 501 is configured to remove water-soluble components contained in the process gas and the cleaning gas by water to prevent production of by-product. The combustion treatment device 502 is configured to burn the process gas and the cleaning gas to render them harmless.

The process gas, such as dichlorosilane (DCS) or ammonia ($NH_3$), used in the film formation process is combustible gas, and the cleaning gas, such as fluorine gas ($F_2$) or hydrogen fluoride gas (HF), used in the cleaning process is combustion-supporting gas. When the process gas and the cleaning gas are mixed, the mixture of these gases may explode. For this reason, the plurality of process chambers 500 are separately coupled to the plurality of wet treatment devices 501, as shown in FIG. 9. According to such arrangements, the process gas, the purge gas, and the cleaning gas discharged from each process chamber 500 are successively sent to the corresponding wet treatment device 501, so that the process gas and the cleaning gas are not mixed in the wet treatment device 501.

However, the conventional abatement apparatus shown in FIG. 9 requires the plurality of wet treatment devices 501 corresponding to the plurality of process chambers 500, respectively, which increase the overall cost of the abatement apparatus. Moreover, a footprint of the abatement apparatus increases.

SUMMARY

Therefore, there is provided an abatement apparatus capable of treating exhaust gas with less wet treatment devices than a conventional abatement apparatus.

Embodiments, which will be described below, relate to an abatement apparatus for treating process gas and cleaning gas discharged from a film forming device, such as a CVD device, used to manufacture semiconductor devices.

In an embodiment, there is provided an abatement apparatus for exhaust gas including process gas and cleaning gas, comprising: at least one pre-wet treatment device; a combustion treatment device; a plurality of gas introduction lines coupled to process chambers of a film forming device, the number of at least one pre-wet treatment device being less than the number of process chambers; a plurality of first flow-path switching devices coupled to the plurality of gas introduction lines, respectively; a first gas delivery line extending from the plurality of first flow-path switching devices to the pre-wet treatment device; a second gas delivery line extending from the plurality of first flow-path switching devices to the combustion treatment device; and an operation controller configured to control operations of the plurality of first flow-path switching devices to deliver the process gas to the pre-wet treatment device and deliver the cleaning gas to the combustion treatment device.

In an embodiment, the operation controller is configured to: operate a first one of the plurality of first flow-path switching devices to establish fluid communication between a first one of the plurality of gas introduction lines and the first gas delivery line, and cut off fluid communication between the first one of the plurality of gas introduction lines and the second gas delivery line when the operation controller receives, from the film forming device, a process-gas discharge signal indicating that the process gas is discharged from one of the process chambers, which is coupled to the first one of the plurality of first flow-path switching devices and the first one of the plurality of gas introduction lines; and operate a second one of the plurality of first flow-path switching devices to establish fluid communication between a second one of the plurality of gas introduction lines and the second gas delivery line, and cut off fluid communication between the second one of the plurality of gas introduction lines and the first gas delivery line when the operation controller receives, from the film forming device, a cleaning-gas discharge signal indicating that the cleaning gas is discharged from one of the process chambers, which is coupled to the second one of the plurality of first flow-path switching devices and the second one of the plurality of gas introduction lines.

In an embodiment, the plurality of first flow-path switching devices comprise a plurality of three-way valves.

In an embodiment, the operation controller is configured to operate the plurality of first flow-path switching devices to establish fluid communication between the plurality of gas introduction lines and the second gas delivery line and to cut off fluid communication between the plurality of gas introduction lines and the first gas delivery line when clogging of the wet treatment device is detected.

In an embodiment, the abatement apparatus further comprises: at least one second flow-path switching device attached to the second gas delivery line; and a bypass line coupled to the second flow-path switching device, the operation controller being configured to operate the second flow-path switching device.

In an embodiment, the operation controller is configured to operate the plurality of first flow-path switching devices to establish fluid communication between the plurality of gas introduction lines and the second gas delivery line and to cut off fluid communication between the plurality of gas introduction lines and the first gas delivery line, and operate the plurality of second flow-path switching devices to establish fluid communication between the second gas delivery line and the bypass line and to cut off fluid communication between the plurality of first flow-path switching devices and the wet treatment device when clogging of the wet treatment device is detected.

In an embodiment, the abatement apparatus further comprises: a post-wet treatment device provided downstream of the combustion treatment device; and an exhaust line coupled to the post-wet treatment device, the bypass line being coupled to the exhaust line.

In an embodiment, the pre-wet treatment device is a single pre-wet treatment device.

The operation controller can send the process gas to the pre-wet treatment device, while sending the cleaning gas to the combustion treatment device by operating the plurality of first flow-path switching devices separately. Since the cleaning gas is not sent to the pre-wet treatment device, the cleaning gas and the process gas are not mixed in the pre-wet treatment device. Therefore, it is not necessary to provide as many wet treatment devices as there are process chambers. As a result, cost and footprint of the abatement apparatus can be reduced.

DESCRIPTION OF EMBODIMENTS

Figure 1:
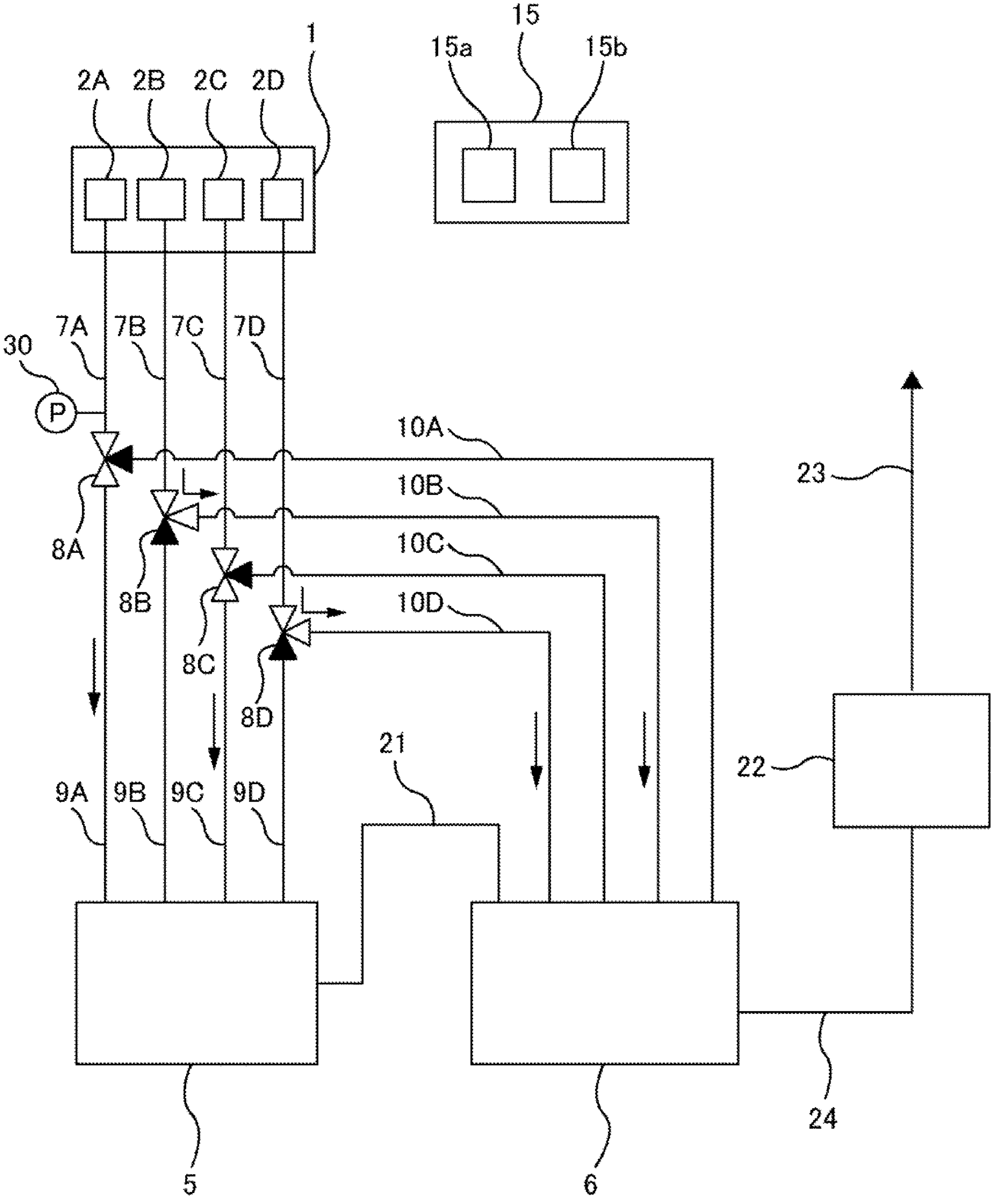
FIG. 1 is a schematic diagram showing one embodiment of an abatement apparatus for treating exhaust gas containing process gas and cleaning gas.

Hereinafter, embodiments will be described with reference to the drawings. FIG. 1 is a schematic diagram showing one embodiment of an abatement apparatus for treating exhaust gas containing process gas and cleaning gas. The abatement apparatus is a device for detoxifying exhaust gas containing process gas and cleaning gas discharged from a film forming device 1 used for manufacturing semiconductor devices. In embodiments described below, the film forming device 1 is a CVD (Chemical Vapor Deposition) device having a plurality of process chambers 2A, 2B, 2C, and 2D.

In the film forming device 1 which is a CVD device, process gas for forming a film on a wafer (i.e., gas containing material of the film), purge gas for removing the process gas from the process chambers 2A to 2D, and cleaning gas for cleaning interiors of the process chambers 2A to 2D are successively supplied into the process chambers 2A to 2D. Examples of the process gas include dichlorosilane (DCS), ammonia ($NH_3$), etc. Examples of the cleaning gas include fluorine gas ($F_2$), hydrogen fluoride gas (HF), nitrogen trifluoride gas ($NF_3$), and chlorine trifluoride gas ($ClF_3$).

In the film forming device 1, a film forming process, a purging process, and a cleaning process are repeatedly performed in the process chambers 2A to 2D at different cycles. The film forming process is a process of introducing the process gas containing material of a film into the process chambers 2A to 2D to form the film on wafers. After the film formation process, the purging process is performed in which the purge gas, such as nitrogen gas, is supplied into the process chambers 2A to 2D to remove the process gas from the process chambers 2A to 2D. Further, the cleaning process is performed in which the cleaning gas, such as fluorine gas ($F_2$) or hydrogen fluoride gas (HF), is supplied into the process chambers 2A to 2D to clean the process chambers 2A to 2D.

As shown in FIG. 1, the abatement apparatus includes a single pre-wet treatment device 5, a single combustion treatment device 6, a plurality of gas introduction lines 7A, 7B, 7C, 7D coupled to the plurality of process chambers 2A, 2B, 2C, 2D of the film forming device 1, respectively, a plurality of first flow-path switching devices 8A, 8B, 8C, 8D coupled to the plurality of gas introduction lines 7A, 7B, 7C, 7D, respectively, a plurality of first gas delivery lines 9A, 9B, 9C, 9D extending from the plurality of first flow-path switching devices 8A, 8B, 8C, 8D to the pre-wet treatment device 5, a plurality of second gas delivery lines 10A, 10B, 10C, 10D extending from the first flow-path switching devices 8A, 8B, 8C, 8D to the combustion treatment device 6, and an operation controller 15 for controlling operations of the first flow-path switching devices 8A, 8B, 8C, 8D.

The operation controller 15 includes at least one computer. The operation controller 15 includes a memory 15*a* and an arithmetic device (or a processor) 15*b*. The arithmetic device 15*b* includes a CPU (Central Processing Unit) or GPU (Graphic Processing Module) configured to perform arithmetic operations according to instructions contained in programs stored in the memory 15*a*. The memory 15*a* includes a main memory (e.g., random access memory) to which the arithmetic device 15*b* is accessible, and an auxiliary memory (e.g., hard disk drive or solid state drive) for storing data and the programs. However, the specific configurations of the operation controller 15 are not limited to these examples.

The pre-wet treatment device 5 is coupled to the combustion treatment device 6 by a first coupling line 21. Ends of the gas introduction lines 7A to 7D are coupled to the process chambers 2A to 2D, respectively, and other ends of the gas introduction lines 7A to 7D are coupled to the first flow-path switching devices 8A to 8D, respectively. The number of gas introduction lines 7A to 7D is the same as the number of first flow-path switching devices 8A to 8D. In this embodiment, four process chambers 2A to 2D, four gas introduction lines 7A to 7D, and four first flow-path switching devices 8A to 8D are provided, but the numbers of these elements are not limited to this embodiment.

Ends of the first gas delivery lines 9A to 9D are coupled to the first flow-path switching devices 8A to 8D, respectively, and other ends of the first gas delivery lines 9A to 9D are coupled to the pre-wet treatment device 5. In the embodiment shown in FIG. 1, the plurality of first gas delivery lines 9A to 9D extend to the pre-wet treatment device 5 without merging with each other, while in one embodiment, the plurality of first gas delivery lines 9A to 9D may join to form at least one confluence line, which is coupled to the pre-wet treatment device 5.

Ends of the second gas delivery lines 10A to 10D are coupled to the first flow-path switching devices 8A to 8D, respectively, and other ends of the second gas delivery lines 10A to 10D are coupled to the combustion treatment device 6. In the embodiment shown in FIG. 1, the plurality of second gas delivery lines 10A to 10D extend to the combustion treatment device 6 without merging with each other, while in one embodiment the plurality of second gas delivery lines 10A to 10D may join to form at least one confluence line, which is coupled to the combustion treatment device 6.

The first flow-path switching devices 8A to 8D are configured to selectively couple the gas introduction lines 7A to 7D to either the first gas delivery lines 9A to 9D or the second gas delivery lines 10A to 10D. These first flow-path switching devices 8A to 8D are configured to operate independently of each other. In the embodiment shown in FIG. 1, each of the first flow-path switching devices 8A to 8D is composed of a three-way valve. Each three-way valve is an actuator-driven valve, such as a motor-driven valve or an electromagnetic valve. In one embodiment, each of the first flow-path switching devices 8A to 8D may be composed of a combination of multiple valves.

The operation controller 15 is electrically coupled to the first flow-path switching devices 8A to 8D, and is configured to be able to operate the first flow-path switching devices 8A to 8D separately. Therefore, for example, as shown in FIG. 1, the operation controller 15 operates the first flow-path switching device 8A to establish fluid communication between the gas introduction line 7A and the first gas delivery line 9A, and to cut off fluid communication between the gas introduction line 7A and the second gas delivery line 10A, while the operation controller 15 operates the first flow-path switching device 8B to cut off fluid communication between the gas introduction line 7B and the first gas delivery line 9B, and to establish fluid communication between the gas introduction line 7B and the second gas delivery line 10B. Similarly, the operation controller 15 can operate the first flow-path switching devices 8C and 8D independently of each other and independently of the first flow-path switching devices 8A and 8B.

The film forming device 1 performs the film forming process, the purging process, and the cleaning process in different cycles in the plurality of process chambers 2A to 2D. Therefore, the process gas, the purge gas, and the cleaning gas are discharged in this order at different timings from the process chambers 2A to 2D. The purge gas is an inert gas, such as nitrogen gas, while the process gas is a combustible gas, and the cleaning gas is a combustion-supporting gas. Therefore, if both the process gas and the cleaning gas are sent to the single pre-wet treatment device 5, both gases may mix in the pre-wet treatment device 5 and may explode.

Thus, the operation controller 15 is configured to control the operations of the first flow-path switching devices 8A to 8D such that the process gas is sent to the pre-wet treatment device 5 while the cleaning gas is sent to the combustion treatment device 6. In other words, the cleaning gas is not sent to the pre-wet treatment device 5. For example, as shown in FIG. 1, when the process gas is discharged from the process chamber 2A, the operation controller 15 operates the first flow-path switching device 8A to establish the fluid communication between the gas introduction line 7A and the first gas delivery line 9A, and cuts off the fluid communication between the gas introduction line 7A and the second gas delivery line 10A. As a result, the process gas is sent to the pre-wet treatment device 5 through the first gas delivery line 9A. In FIG. 1, white triangle of the first flow-path switching device 8A represents an open state, and black triangle represents a closed state.

At the same time, when the cleaning gas is discharged from the process chamber 2B, the operation controller 15 operates the first flow-path switching device 8B to cut off the fluid communication between the gas introduction line 7B and the first gas delivery line 9B, and establish the fluid communication between the gas introduction line 7B and the second gas delivery line 10B. As a result, the cleaning gas is not sent to the pre-wet treatment device 5, but is sent to the combustion treatment device 6 through the second gas delivery line 10B. In FIG. 1, white triangle of the first flow-path switching device 8B represents an open state, and black triangle represents a closed state.

Figure 9:
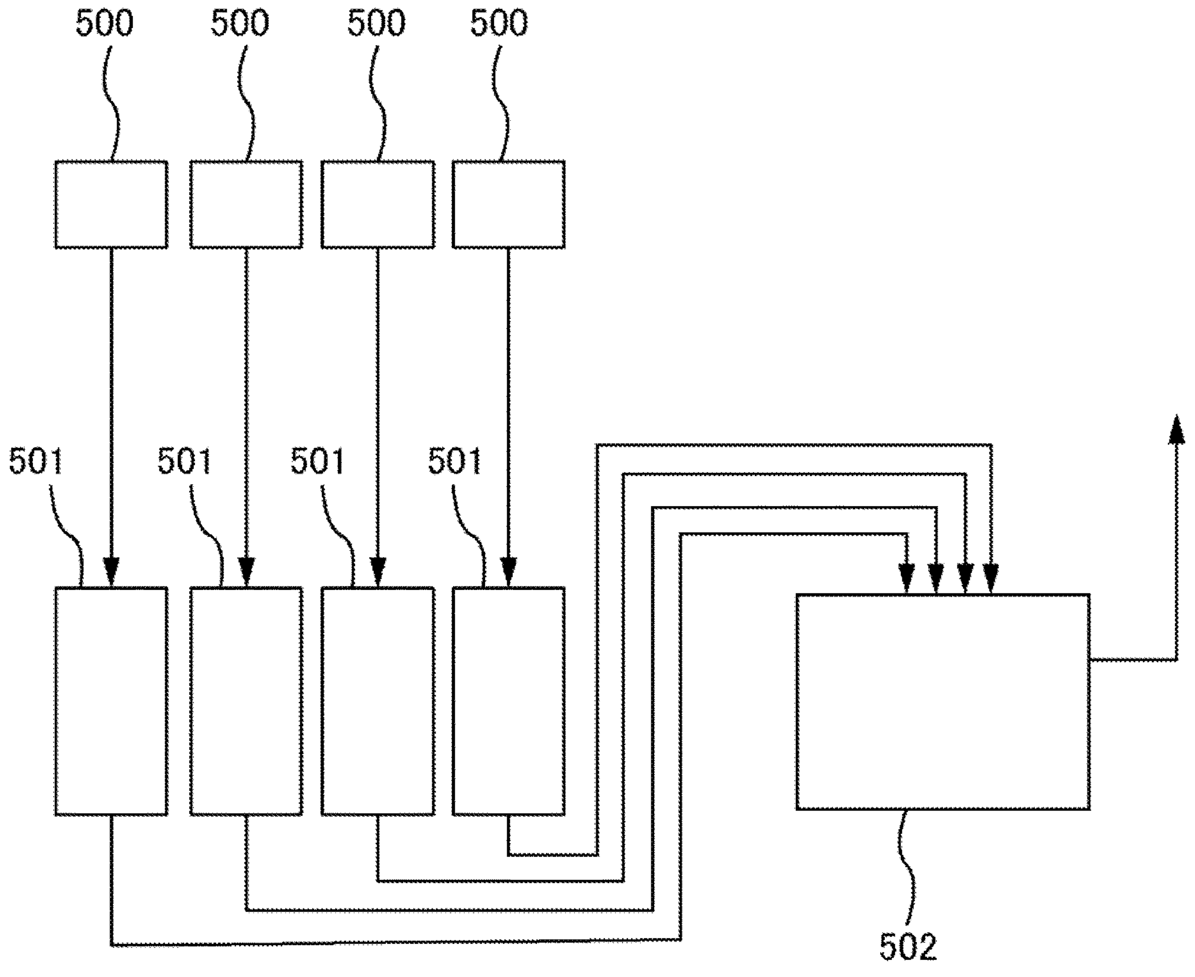
FIG. 9 is a schematic diagram showing a conventional abatement apparatus.

In this manner, the operation controller 15 operates the first flow-path switching devices 8A to 8D separately to transfer the process gas to the pre-wet treatment device 5, while transferring the cleaning gas to the combustion treatment device 6. Since the cleaning gas is not transferred to the pre-wet treatment device 5, the cleaning gas and the process gas are not mixed in the pre-wet treatment device 5. Therefore, unlike the conventional abatement apparatus shown in FIG. 9, it is not necessary to provide as many wet treatment devices as the number of process chambers. In particular, in the embodiment shown in FIG. 1, only the single pre-wet treatment device 5 is provided, thus reducing cost and footprint of the abatement apparatus.

In one embodiment, in order to ensure the process gas to be sent to the pre-wet treatment device 5 and to prevent the cleaning gas from being sent to the pre-wet treatment device 5, the operation controller 15 may operate the first flow-path switching devices 8A to 8D at timings when the purge gas is passing through the first flow-path switching devices 8A to 8D.

The operation controller 15 is electrically coupled to the film forming device 1 and configured to receive a process-gas discharge signal, a purge-gas discharge signal, and a cleaning-gas discharge signal issued from the film forming device 1. The film forming device 1 is configured to generate the process-gas discharge signal and transmit it to the operation controller 15 when the process gas is discharged from any one of the process chambers 2A to 2D. The process-gas discharge signal contains information identifying one of the process chambers 2A to 2D from which the process gas is discharged.

For example, when the operation controller 15 receives, from the film forming device 1, the process-gas discharge signal indicating that the process gas is discharged from the process chamber 2A, the operation controller 15 operates the first flow-path switching device 8A corresponding to the process chamber 2A to establish the fluid communication between the corresponding gas introduction line 7A and the first gas delivery line 9A, and cut off the fluid communication between the corresponding gas introduction line 7A and the second gas delivery line 10A. By operating the first flow-path switching device 8A in this way, the process gas discharged from the process chamber 2A flows through the gas introduction line 7A, the first flow-path switching device 8A, and the first gas delivery line 9A to the pre-wet treatment device 5.

The film forming device 1 is configured to generate the cleaning-gas discharge signal and transmit it to the operation controller 15 when the cleaning gas is discharged from any one of the plurality of process chambers 2A to 2D. The cleaning-gas discharge signal contains information identifying one of the process chambers 2A to 2D from which the cleaning gas is discharged.

For example, when the operation controller 15 receives, from the film forming device 1, the cleaning-gas discharge signal indicating that the cleaning gas is discharged from the process chamber 2B, the operation controller 15 operates the first flow-path switching device 8B corresponding to the process chamber 2B to cut off the fluid communication between the corresponding gas introduction line 7B and the first gas delivery line 9B, and establish the fluid communication between the corresponding gas introduction line 7B and the second gas delivery line 10B. By such operation of the first flow-path switching device 8B, the cleaning gas discharged from the process chamber 2B flows through the gas introduction line 7B, the first flow-path switching device 8B, and the second gas delivery line 10B to the combustion treatment device 6.

The abatement apparatus further includes a post-wet treatment device 22 provided downstream of the combustion treatment device 6, and an exhaust line 23 coupled to the post-wet treatment device 22. The post-wet treatment device 22 is coupled to the combustion treatment device 6 by a second coupling line 24. According to the abatement apparatus having such configurations, the process gas is sequentially treated by the pre-wet treatment device 5, the combustion treatment device 6, and the post-wet treatment device 22, and the cleaning gas is sequentially treated by the combustion treatment device 6 and the post-wet treatment device 22.

When the cleaning gas, including fluorine gas ($F_2$), hydrogen fluoride gas (HF), or nitrogen trifluoride gas ($NF_3$), is subjected to the wet treatment, acidic water that is corrosive to metal may be produced. According to the embodiment shown in FIG. 1, the cleaning gas bypasses the pre-wet treatment device 5. Therefore, corrosion of the first coupling line 21 coupling the pre-wet treatment device 5 to the combustion treatment device 6 can be prevented.

In addition, since the cleaning gas bypasses the pre-wet treatment device 5, the cleaning gas is delivered to the combustion treatment device 6 while the cleaning gas is maintained in a dry state, so that a decrease in the temperature of the cleaning gas can be avoided. As a result, the combustion treatment device 6 can burn the cleaning gas with high efficiency. In particular, the combustion treatment apparatus 6 can treat the cleaning gas containing a persistent gas, such as chlorine trifluoride gas ($ClF_3$), with high efficiency.

Mixture of the process gas and the cleaning gas may form a solidified by-product as the temperature of the mixture decreases. Examples of the by-product include ammonium fluoride and ammonium fluorosilicate. The by-product is likely to be formed upstream of the combustion treatment device 6 where the temperature is the lowest. The by-product can clog the gas flow path, and therefore formation of the by-product should be avoided as much as possible. According to the above embodiment, the ammonia ($NH_3$) contained in the process gas is removed by the pre-wet treatment device 5, and the cleaning gas bypasses the pre-wet treatment device 5, so that the above-mentioned by-product is not produced. Furthermore, since ammonia is removed by the pre-wet treatment device 5, generation of NOx in the next combustion treatment device 6 is suppressed.

As shown in FIG. 1, the abatement apparatus includes a pressure sensor 30 coupled to at least one of the gas introduction lines 7A to 7D. In the embodiment shown in FIG. 1, the pressure sensor 30 is coupled to the gas introduction line 7A. The pressure sensor 30 is electrically coupled to the operation controller 15, and a measured value of pressure in the gas introduction line 7A is transmitted from the pressure sensor 30 to the operation controller 15. A plurality of pressure sensors 30 may be coupled to the plurality of gas introduction lines 7A to 7D, respectively.

The by-product, which is made of a component of the process gas, may be deposited in the pre-wet treatment device 5. As the deposition of such by-product progresses, an internal flow path of the pre-wet treatment device 5 may be clogged. Therefore, the operation controller 15 is configured to detect clogging of the pre-wet treatment device 5 based on the measured value of the pressure transmitted from the pressure sensor 30. Specifically, when the measured value of the pressure in the gas introduction line 7A is above a threshold value under the condition that the first flow-path switching device 8A establishes the fluid communication between the gas introduction line 7A and the first gas delivery line 9A, and when the measured value of the pressure in the gas introduction line 7A is below the threshold value under the condition that the first flow-path switching device 8A establishes the fluid communication between the gas introduction line 7A and the second gas delivery line 10A, the operation controller 15 determines that the pre-wet treatment device 5 is clogged.

On the other hand, when the measured value of the pressure in the gas introduction line 7A is below the threshold value under the condition that the first flow-path switching device 8A establishes the fluid communication between the gas introduction line 7A and the first gas delivery line 9A, the operation controller 15 determines that both the pre-wet treatment device 5 and the combustion treatment device 6 are not clogged.

Figure 2:
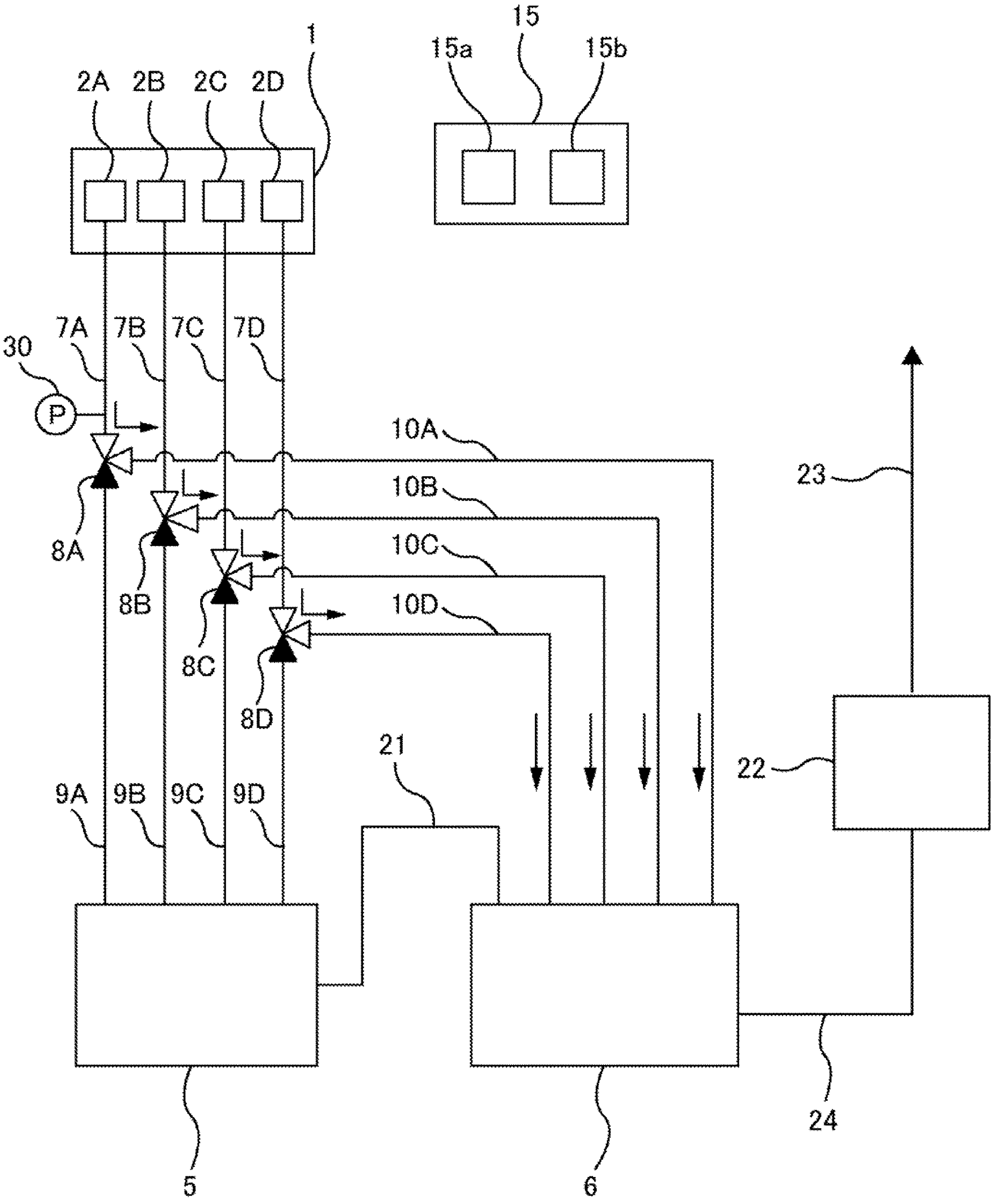
FIG. 2 is a schematic diagram illustrating au operating state in which the process gas bypasses a pre-wet treatment device and is sent to a combustion treatment device.

As shown in FIG. 2, when the operation controller 15 determines that the pre-wet treatment device 5 is clogged, the operation controller 15 operates all the first flow-path switching devices 8A to 8D to cut off the fluid communication between all the gas introduction lines 7A to 7D and all the first gas delivery lines 9A to 9D, and establishes the fluid communication between all the gas introduction lines 7A to 7D and all the second gas delivery lines 10A to 10D. By such operations, the process gas is not delivered to the pre-wet treatment device 5 (i.e., the process gas bypasses the pre-wet treatment device 5), and is delivered to the combustion treatment device 6. Although the process gas and the cleaning gas may be delivered to the combustion treatment apparatus 6 simultaneously, the process gas (which is a combustible gas) and the cleaning gas (which is a combustion-supporting gas) are mixed in the combustion treatment apparatus 6 to form mixture gas, which is quickly burned in the combustion treatment apparatus 6, so that unexpected explosion does not occur.

Figure 3:
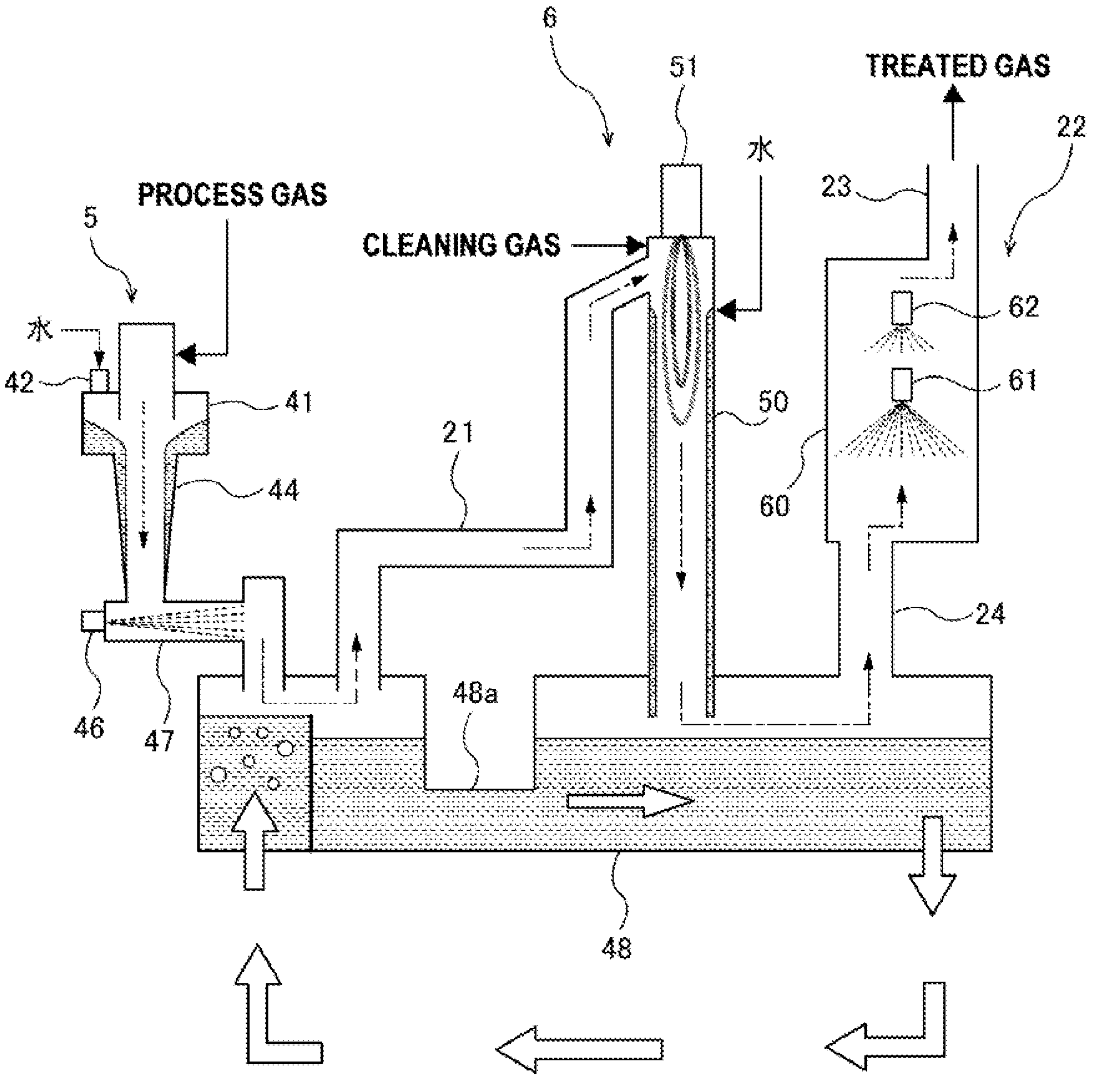
FIG. 3 is a cross-sectional diagram showing an embodiment of detailed structures of the pre-wet treatment device, the combustion treatment device, and a post-wet treatment device.

FIG. 3 is a cross-sectional view showing an embodiment of detailed structures of the pre-wet treatment device 5, the combustion treatment device 6, and the post-wet treatment device 22. As shown in FIG. 3, the pre-wet treatment device 5 includes a water storage chamber 41, a water supply nozzle 42 for supplying water to the water storage chamber 41, a wet-wall portion 44 in which the water flows downward from the water storage clamber 41 to form a wet wall, a water ejector 46 for spraying water onto the process gas that has passed through the wet-wall portion 44, and a gas-liquid separation tank 48 for separating water and gas from each other. The pre-wet treatment device 5 is coupled to the combustion treatment device 6 by the first coupling line 21, and the combustion treatment device 6 is coupled to the post-wet treatment device 22 by the gas-liquid separation tank 48 and the second coupling line 24.

The combustion treatment device 6 includes a combustion chamber 50 to which the first coupling line 21 is coupled, a burner 51 for forming a flame in the combustion chamber 50, and the gas-liquid separation tank 48 for separating water and gas from each other. The gas-liquid separation tank 48 is shared with the pre-wet treatment apparatus 5, and the water in the gas-liquid separation tank 48 circulates as indicated by arrows. A narrowed flow path 48*a*, which is a part of the gas-liquid separation tank 48, is filled with water, so that the narrowed flow path 48*a* located between the pre-wet treatment device 5 and the combustion treatment device 6 is sealed with water.

The post-wet treatment device 22 includes a water treatment chamber 60 coupled to the second coupling line 24, and water spray nozzles 61 and 62 arranged in the water treatment chamber 60. The second coupling line 24 is coupled to the gas-liquid separation tank 48 of the combustion treatment device 6.

The process gas and the cleaning gas are treated as follows. The process gas is first treated by the pre-wet treatment device 5. The process gas flows into the water storage chamber 41 and then flows downward through the wet-wall portion 44. The water ejector 46 sprays water onto the process gas flowing through a flow path 47, thereby removing water-soluble components contained in the process gas. For example, Si component contained in dichlorosilane (DCS) dissolves in the water and is removed therefrom, so that a treatment load of the subsequent combustion treatment device 6 is reduced. Ammonia ($NH_3$) in the process gas is also removed by the water.

The water sprayed from the water ejector 46 and the process gas are separated in the gas-liquid separation tank 48. The water is stored in the gas-liquid separation tank 48, while the process gas flows through the first coupling line 21 into the combustion chamber 50 of the combustion treatment device 6. The water in the gas-liquid separation tank 48 contains ammonia ($NH_3$) in the process gas and becomes alkaline water. This alkaline water does not corrode the gas-liquid separation tank 48 made of metal, and does not require a coating for preventing the corrosion.

The process gas that has been treated by the pre-wet treatment device 5 is then treated by the combustion treatment device 6. The cleaning gas is not treated by the pre-wet treatment device 5 and is treated by the combustion treatment device 6. The burner 51 forms the flame in the combustion chamber 50, and the process gas (which is a combustible gas) and the cleaning gas (which is a combustion-supporting gas) are combusted by the flame. The wet wall, which is a water film in this embodiment, is formed on the inner surface of the combustion chamber 50 to protect the combustion chamber 50.

The process gas and/or the cleaning gas that have been subjected to the combustion treatment (which will be hereinafter referred to as "treated gas") flows downward in the combustion chamber 50, passes through the gas-liquid separation tank 48, and passes through the second coupling line 24 into the post-yet treatment device 22. The post-wet treatment device 22 further performs the wet treatment on the treated gas by spraying water onto the treated gas from the water spray nozzles 61 and 62. The treated gas that has been wet-treated by the post-wet treatment device 22 is discharged from the abatement apparatus through the exhaust line 23. In this way, the process gas is treated by the pre-wet treatment device 5, the combustion treatment device 6, and the post-wet treatment device 22, and the cleaning gas is treated by the combustion treatment device 6 and the post-wet treatment device 22.

In the embodiment shown in FIG. 3, the gas-liquid separation tank 48 is used for both the pre-wet treatment device 5 and the combustion treatment device 6. Since the narrowed flow path 48*a* located between the pre-wet treatment device 5 and the combustion treatment device 6 is always filled with water, the process gas does not flow through the gas-liquid separation tank 48 from the pre-wet treatment device 5 to the combustion treatment device 6. However, along with the water sprayed from the water ejector 46, the process gas may drop into the water in the gas-liquid separation tank 48 and generate bubbles in the water. The bubbles made up of the process gas may be carried by the water circulating in the gas-liquid separation tank 48 and may reach the downstream side of the combustion treatment device 6 through the narrowed flow path 48*a*. Although such shortcut of the process gas may occur, the short-cut process gas is treated by the post-wet treatment device 22, and therefore the process gas is not released in an untreated state.

On the other hand, the cleaning gas does not flow into the pre-wet treatment device 5. Therefore, short cut of the cleaning gas through the gas-liquid separation tank 48 as described above does not occur in principle. Specifically, the cleaning gas always passes through the combustion treatment device 6 and is treated by the combustion treatment device 6. Further, the cleaning gas is treated by the post-wet treatment device 22.

Next, another embodiment of the abatement apparatus will be described with reference to FIG. 4. Configurations and operations of this embodiment, which will not be particularly described, are the same as those of the embodiments described with reference to FIGS. 1 to 3.

Figure 4:
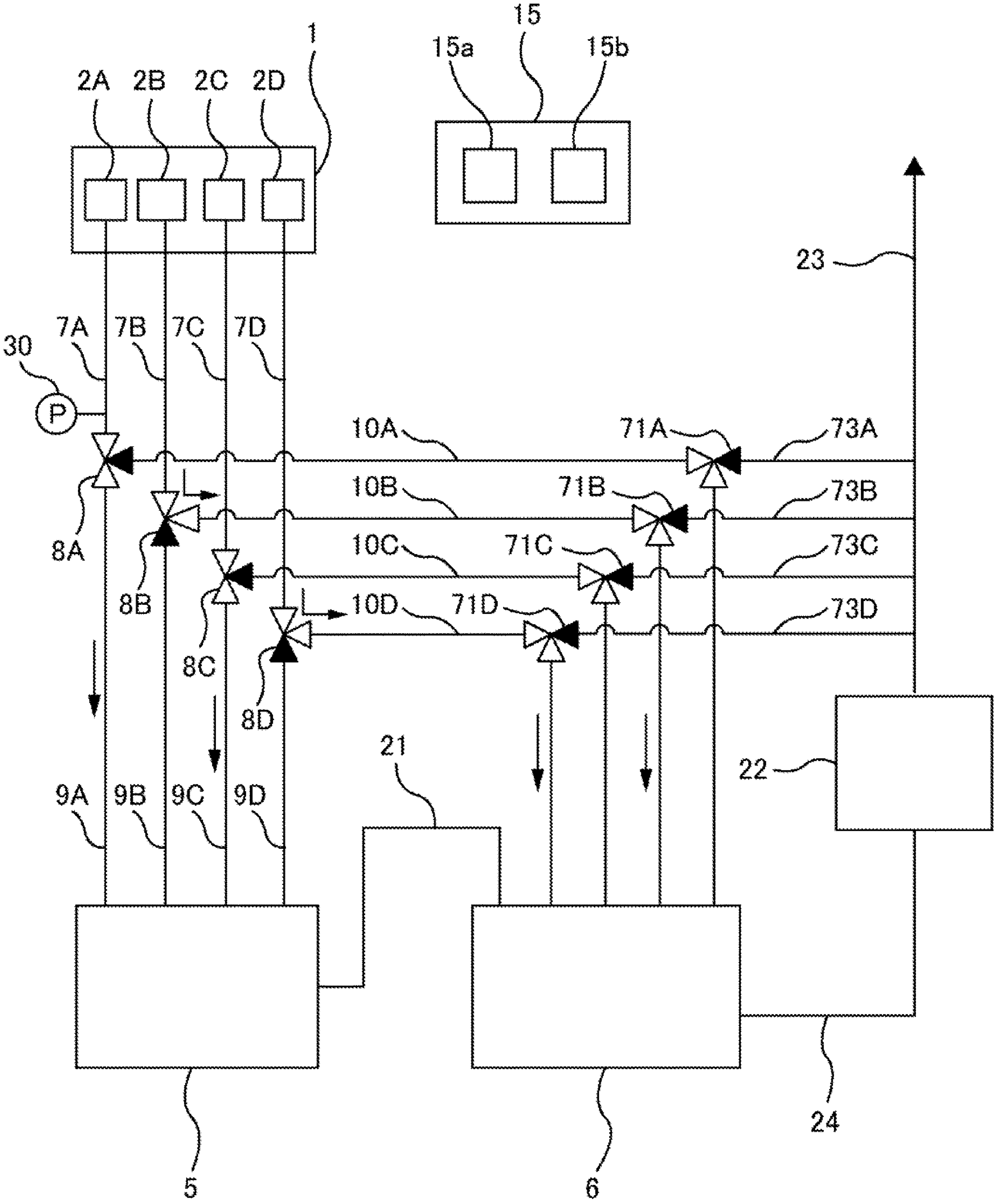
FIG. 4 is a schematic diagram showing another embodiment of the abatement apparatus.

As shown in FIG. 4, the abatement apparatus includes a plurality of second flow-path switching devices 71A, 71B, 71C, and 71D attached to the plurality of second gas delivery lines 10A, 10B, 10C, and 10D, respectively, and a plurality of bypass lines 73A, 73B, 73C, and 73D coupled to the plurality of second flow-path switching devices 71A, 71B, 71C, and 71D, respectively. The bypass lines 73A to 73D are coupled to the exhaust line 23. The second flow-path switching devices 71A to 71D are electrically coupled to the operation controller 15, and the operation controller 15 is configured to be able to operate the second flow-path switching devices 71A to 71D independently. In the embodiment shown in FIG. 4, each of the second flow-path switching devices 71A to 71D is composed of a three-way valve. Each three-way valve is an actuator-driven valve, such as a motor-driven valve or an electromagnetic valve. In one embodiment, each of the second flow-path switching devices 71A to 71D may be composed of a combination of multiple valves.

The second flow-path switching devices 71A to 71D are configured to selectively pass the cleaning gas flowing through the second gas delivery lines 10A to 10D to either the combustion treatment device 6 or the bypass lines 73A to 73D. Specifically, the second flow-path switching devices 71A to 71D are configured to be able to switch between a normal route and an emergency route. The normal route is a route that allows fluid communication between the first flow-path switching devices 8A to 8D and the combustion treatment device 6 and cuts off fluid communication between the second gas delivery lines 10A to 10D and the bypass lines 73A to 73D. The emergency route is a route that allows the fluid communication between the second gas delivery lines 10A to 10D and the bypass lines 73A to 73D and cuts off the fluid communication between the first flow-path switching devices 8A to 8D and the combustion treatment device 6.

In FIG. 4, white triangles of the second flow-path switching devices 71A to 71D indicate open state, and black triangles indicate closed state. During normal operation, as shown in FIG. 4, the second flow-path switching devices 71A to 71D are in the state of the normal route. Specifically, the first flow-path switching devices 8A to 8D communicate with the combustion treatment device 6 through the second flow-path switching devices 71A to 71D, and the fluid communication between the second gas delivery lines 10A to 10D and the bypass lines 73A to 73D are cut of by the second flow-path switching devices 71A to 71D. Therefore, the cleaning gas can be delivered to the combustion treatment device 6 via the gas introduction lines 7A to 7D, the first flow-path switching devices 8A to 8D, the second gas delivery lines 10A to 10D, and the second flow-path switching devices 71A to 71D.

Figure 5:
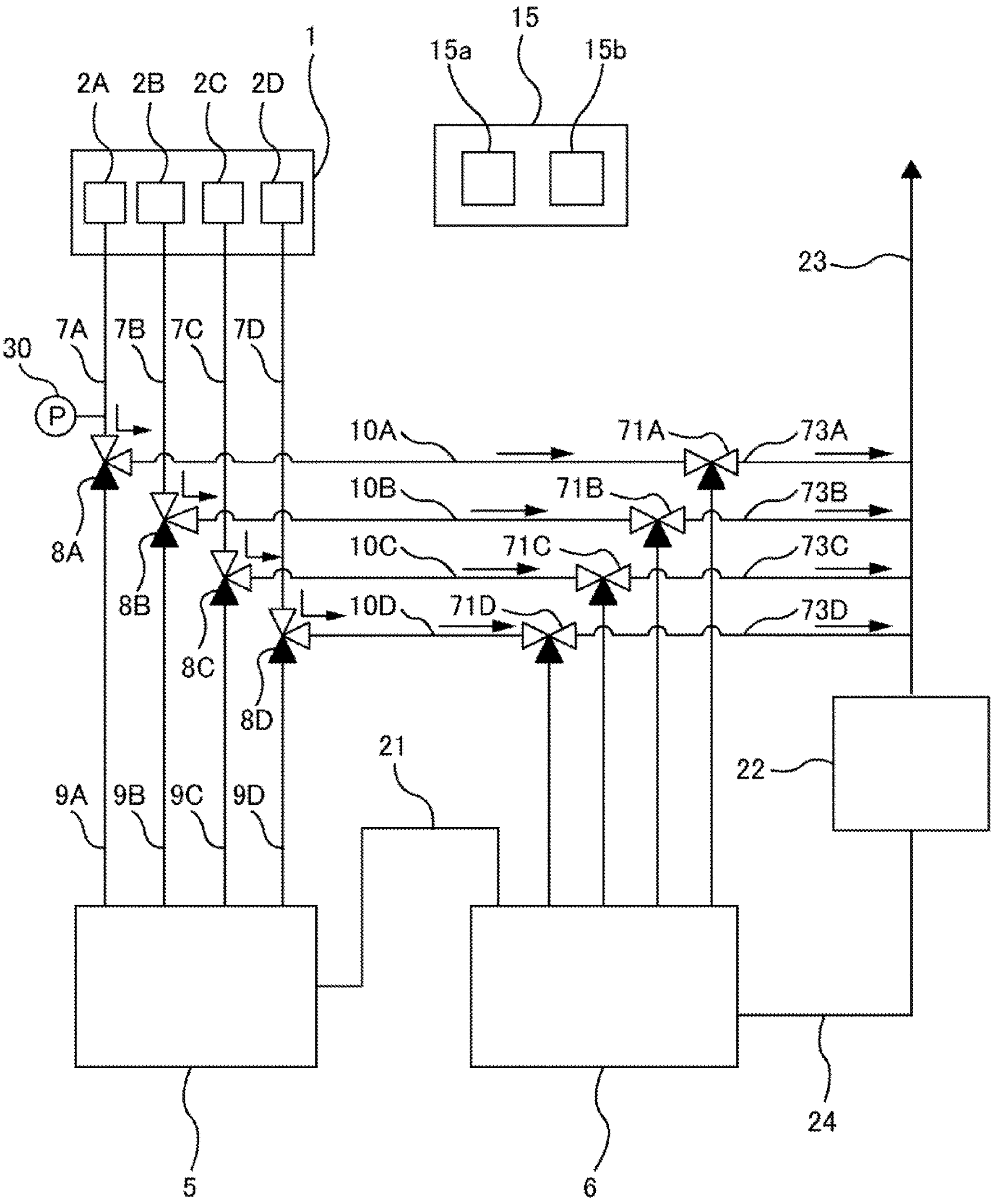
FIG. 5 is a diagram for explaining flows of the process gas and the cleaning gas when a serious failure has occurred in the combustion treatment device.

On the other hand, when a serious failure has occurred and the abatement apparatus should be stopped, as shown in FIG. 5, the operation controller 15 operates the first flow-path switching devices 8A to 8D to establish the fluid communication between the gas introduction lines 7A to 7D and the second gas delivery lines 10A to 10D and cut off the fluid communication between the gas introduction lines 7A to 7D and the first gas delivery lines 9A to 9D. Furthermore, the operation controller 15 operates the second flow-path switching devices 71A to 71D to switch from the normal route to the emergency route. Specifically, the second gas delivery lines 10A to 10D communicate with the bypass lines 73A to 73D via the second flow-path switching devices 71A to 71D, and the fluid communication between the first flow-path switching devices 8A to 8D (and the gas introduction lines 7A to 7D) and the combustion treatment device 6 is blocked by the second flow-path switching devices 71A to 71D. Thus, the process gas and the cleaning gas bypass both the pre-wet treatment device 5 and the combustion treatment device 6 and are delivered to the exhaust line 23. More specifically, the process gas and the cleaning gas are delivered to the exhaust line 23 via the gas introduction lines 7A to 7D, the first flow-path switching devices 8A to 8D, the second gas delivery lines 10A to 10D, the second flow-path switching devices 71A to 71D, and the bypass lines 73A to 73D.

An example of the serious failure that requires the stoppage of the abatement apparatus includes clogging of the combustion treatment device 6. The operation controller 15 can detect clogging of the combustion treatment device 6 based on the measured value of the pressure in the gas introduction line 7A transmitted from the pressure sensor 30. More specifically, when the measured value of the pressure in the gas introduction line 7A is above the threshold value under the condition that the first flow-path switching device 8A provides the fluid communication between the gas introduction line 7A and the second gas delivery line 10A, the operation controller 15 determines that the combustion treatment device 6 is clogged.

As shown in FIG. 5, when the operation controller 15 determines that the combustion treatment device 6 is clogged, the operation controller 15 operates all the first flow-path switching devices 8A to 8D to cut off the fluid communication between all gas introduction lines 7A to 7D and all the first gas delivery lines 9A to 9D, and establishes the fluid communication between all the gas introduction lines 7A to 7D and all the second gas delivery lines 10A to 10D. Furthermore, the operation controller 15 operates all the second flow-path switching devices 71A to 71D to cut off the fluid communication between all the first flow-path switching devices 8A to 8D and the combustion treatment device 6, and establishes the fluid communication between all the second gas delivery lines 10A to 10D and all the bypass lines 73A to 73D.

By such operations, the process gas and the cleaning gas are not delivered to both the pre-wet treatment device 5 and the combustion treatment device 6 (i.e., the process gas and the cleaning gas bypass both the pre-wet treatment device 5 and the combustion treatment device 6), and are delivered to the exhaust line 23. As a result, damage due to a pressure increase within the abatement apparatus is prevented.

When a flame failure has occurred in the combustion treatment device 6 due to a malfunction of the burner 51 or other element, a combustion failure signal is sent to the operation controller 15 from a combustion detector (not shown). When the operation controller 15 receives the combustion failure signal (i.e., when the flame failure has occurred in the combustion treatment device 6), the operation controller 15 maintains the normal route of the second flow-path switching devices 71A to 71D. The flame failure is classified as a minor failure, and the combustion treatment device 6 with no flame simply functions as a flow passage. Therefore, the process gas that has been treated in the pre-wet treatment device 5 and the cleaning gas that has been transferred through the second gas delivery lines 10A to 10D simply pass through the combustion treatment device 6.

Figure 6:
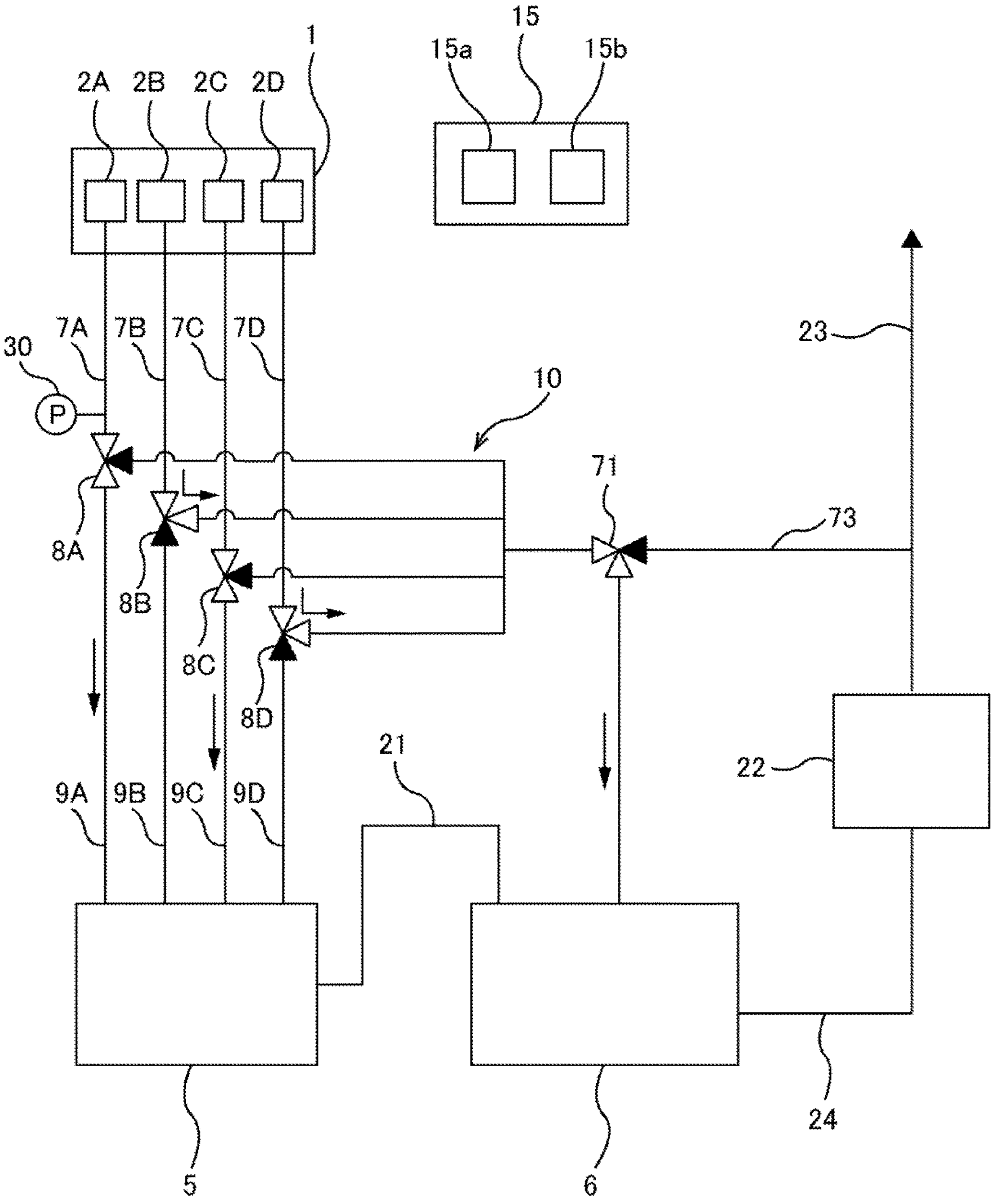
FIG. 6 is a schematic diagram showing still another embodiment of the abatement apparatus.
Figure 7:
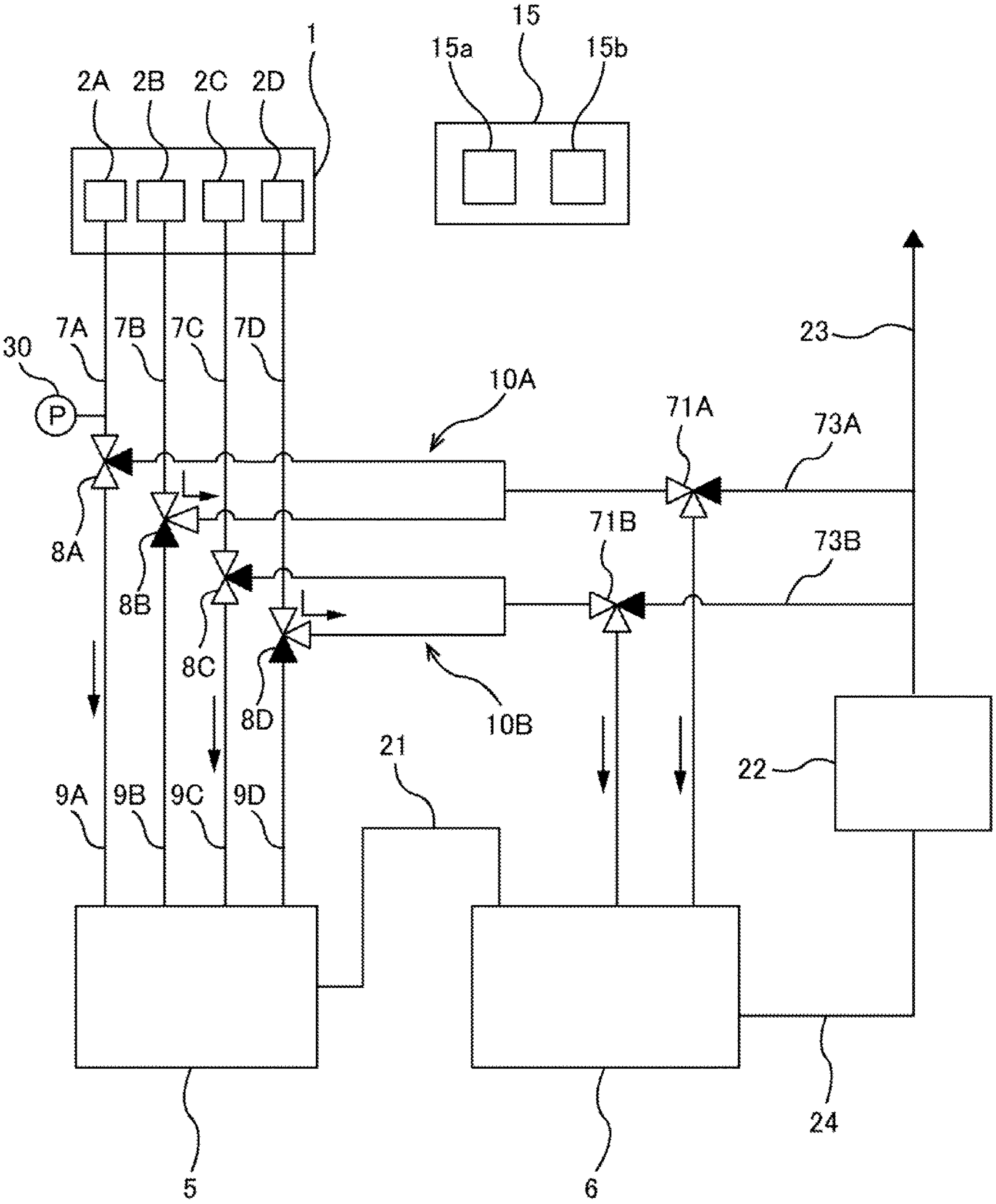
FIG. 7 is a schematic diagram showing still another embodiment of the abatement apparatus.

In one embodiment, as shown in FIG. 6, a second gas delivery line 10 may be a collecting line having ends coupled to the first flow-path switching devices 8A to 8D and other end coupled to the combustion treatment device 6. In this embodiment, a single second flow-path switching device 71 may be attached to the second gas delivery line 10 and a single bypass line 73 may be coupled to the second flow-path switching device 71. Furthermore, as shown in FIG. 7, a plurality of second flow-path switching devices 71A and 71B, which are less in number than the first flow-path switching devices 8A to 8D, may be attached to second gas delivery lines 10A and 10B.

Figure 8:
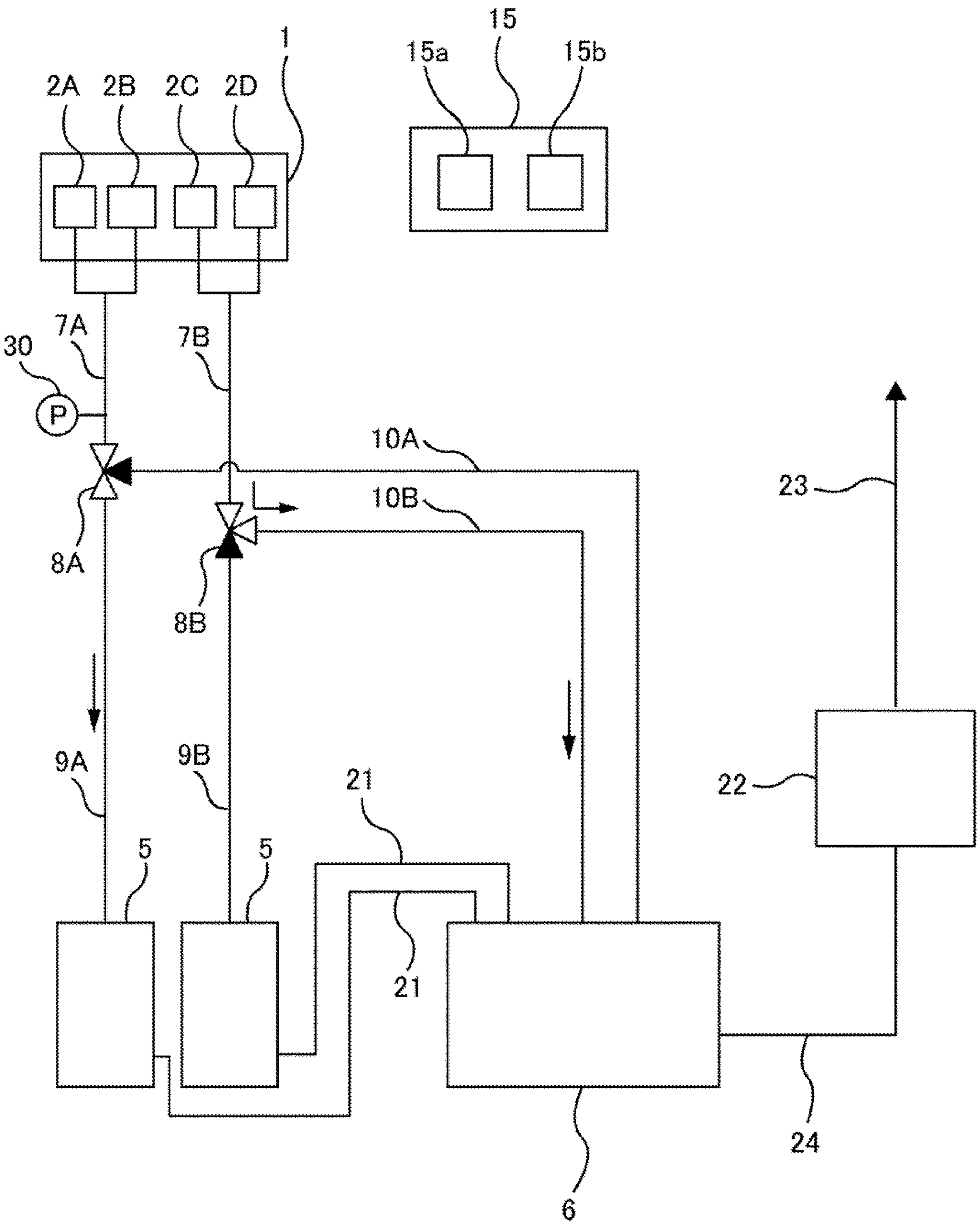
FIG. 8 is a schematic diagram showing still another embodiment of the abatement apparatus.

In the embodiments shown in FIGS. 1 to 7, only the single pre-wet treatment device 5 is provided, while in one embodiment a plurality of pre-wet treatment devices, which are less in number than the plurality of process chambers 2A to 2D, may be provided. For example, in the example shown in FIG. 8, a gas introduction line 7A is composed of a collecting line coupled to a plurality of process chambers 2A and 2B in which the film formation process and the cleaning process are performed in the same cycle, and a gas introduction line 7B is composed of a collecting line coupled to a plurality of process chambers 2C and 2D in which the film formation process and the cleaning process are performed in the same cycle. In this embodiment, a plurality of pre-wet treatment devices 5 corresponding to these gas introduction lines 7A and 7B may be provided. In this embodiment also, the number of pre-wet treatment devices 5 is less than the number of process chambers 2A to 2D, and therefore low cost and small footprint of the abatement system can be achieved.

The previous description of embodiments is provided to enable a person skilled in the art to make and use the present invention. Moreover, various modifications to these embodiments will be readily apparent to those skilled in the art, and the generic principles and specific examples defined herein may be applied to other embodiments. Therefore, the present invention is not intended to be limited to the embodiments described herein but is to be accorded the widest scope as defined by limitation of the claims.

What is claimed is:

1. An abatement apparatus for exhaust gas including process gas and cleaning gas, comprising:

at least one pre-wet treatment device;

a combustion treatment device;

a plurality of gas introduction lines coupled to process chambers of a film forming device, the number of at least one pre-wet treatment device being less than the number of process chambers;

a plurality of first flow-path switching devices coupled to the plurality of gas introduction lines, respectively;

a first gas delivery line extending from the plurality of first flow-path switching devices to the pre-wet treatment device;

a second gas delivery line extending from the plurality of first flow-path switching devices to the combustion treatment device;

at least one second flow-path switching device attached to the second gas delivery line;

a bypass line coupled to the second flow-path switching device;

a pressure sensor coupled to at least one of the plurality of gas introduction lines; and an operation controller having a program containing instructions and an arithmetic device configured to perform arithmetic operations according to the instructions, the instructions being configured to control operations of the plurality of first flow-path switching devices and the at least one second flow-path switching device to deliver the process gas to the pre-wet treatment device and deliver the cleaning gas to the combustion treatment device, wherein the operation controller is configured to instruct the plurality of first flow-path switching devices to establish fluid communication between the plurality of gas introduction lines and the second gas delivery line and to cut off fluid communication between the plurality of gas introduction lines and the first gas delivery line, and instruct the at least one second flow-path switching device to establish fluid communication between the second gas delivery line and the bypass line and to cut off fluid communication between the plurality of first flow-path switching devices and the combustion treatment device when a pressure value measured by the pressure sensor exceeds a threshold value.

2. The abatement apparatus according to claim 1, further comprising:

a post-wet treatment device provided downstream of the combustion treatment device; and an exhaust line coupled to the post-wet treatment device, the bypass line being coupled to the exhaust line.

3. The abatement apparatus according to claim 1, wherein the at least one pre-wet treatment device is a single pre-wet treatment device.

* * * * *